(No Model.)  2 Sheets—Sheet 2.
A. R. GRIEBOV.
DYNAMO ELECTRIC MACHINE OR ELECTRIC MOTOR.
No. 586,234.  Patented July 13, 1897.
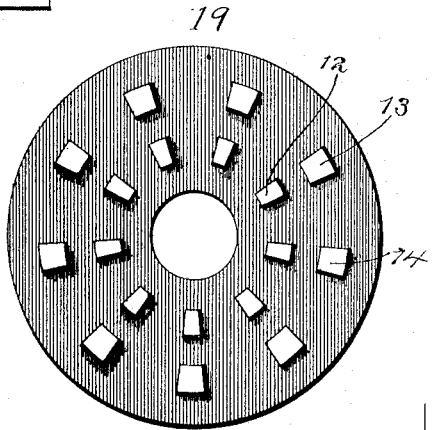
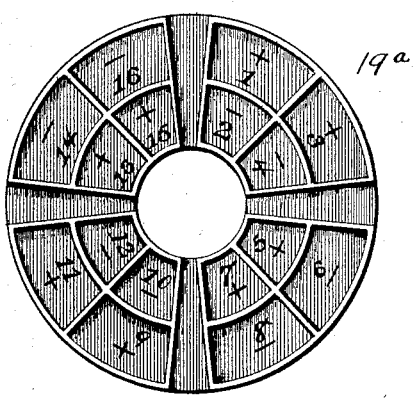
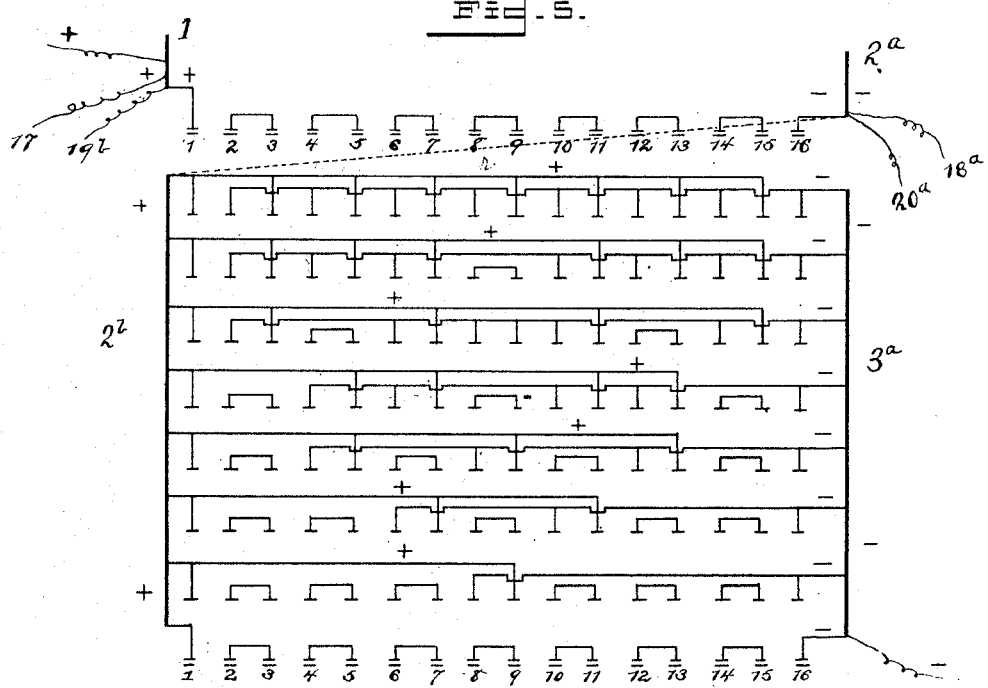
Witnesses
F. S. Belt.
H. Joseph Doyle.
Inventor:
Abraham R. Griebov,
by J. Roberts Rush Jr.
Attorney.

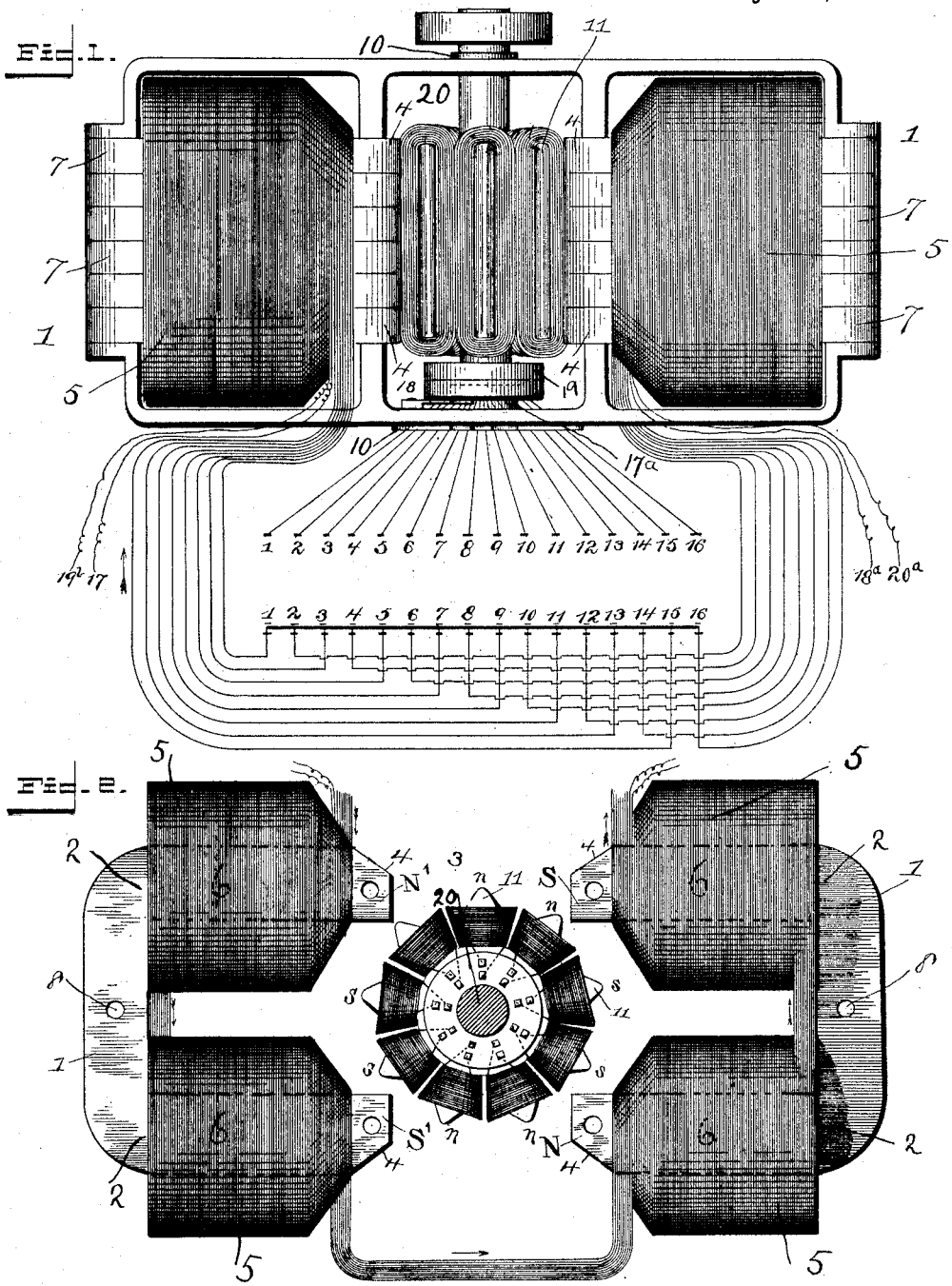

UNITED STATES PATENT OFFICE.

ABRAHAM RAPHAEL GRIEBOV, OF BALTIMORE, MARYLAND.

DYNAMO-ELECTRIC MACHINE OR ELECTRIC MOTOR.

SPECIFICATION forming part of Letters Patent No. 586,234, dated July 13, 1897.

Application filed June 2, 1896. Serial No. 593,996. (No model.)

*To all whom it may concern:*

Be it known that I, ABRAHAM RAPHAEL GRIEBOV, a citizen of the United States, residing at Baltimore city, in the State of Maryland, have invented a new and useful Method of Constructing a Dynamo or Motor, of which the following is a specification.

The objects of my invention are to provide a single machine which will be capable of working either as a dynamo or motor in series, shunt, or compound wound, and, further, to provide a dynamo or motor in which the surface of the periphery of the armature, except a fractional part thereof, shall act on the field-magnets and be reacted upon by them. I attain these objects by arranging the various parts of the machine as shown in the drawings, in which—

Figure 1 is a plan view of a dynamo embodying my invention; Fig. 2, a side view thereof; Fig. 3, a cross-section of the commutator; Fig. 4, a section of the collector, and Fig. 5 a diagrammatic view of the switchboard.

In order to cause the entire periphery of the armature to act on the field-magnets and be reacted upon by them, the machine must never have less than four poles to form the magnetic field of force around the armature, and the armature must be of the radial type, but modified, as will appear hereinafter. The manner of arranging the field-magnets around the armature so that they will give the best result is shown in Fig. 2, where N S and N' S' are the poles and the central portion 3 the armature. For ordinary sizes of dynamos or motors the field-magnets by their simple form admit being made of wrought-iron, a portion 1, being bent twice on itself at right angles, as at 2, in order that both poles of the field-magnet shall be directed around the armature 3, as seen in Fig. 2.

If the field-magnets be made of thick iron, a part of each pole at the face looking from the armature should be cut off at 4, Fig. 2, in order that the magnetic current shall be fully completed through the armature only.

Lengthwise of each leg 6 of the field-magnets, between the armature and its back, is slipped on a wedge-shaped coil 5, of insulated copper wire, and these four coils are so connected that when a current is passed through them the poles become magnetized in the order shown in Fig. 2. As is obvious, the quantity of wire used in the fields may be unlimited. To increase the quantity of iron, I may either lengthen the legs of the field-magnets 6 or thicken the entire cores, as desired.

When a large quantity of copper wire is desired to be put in the fields, they may be shaped to admit it by increasing the length of their backs, thereby distending the legs to admit a thick coil; but it is to be observed that the poles must not be distended unless the armature be increased appropriately.

The machine may be of any length; but, as the field-magnets are made of square rod-iron, in order to bring the machine to any required length several rods of iron 7 are bent to the required form and are locked together by iron bolts 8. The two opposite sets of magnets are held together by two continuous squares of brass or other magnetic material, placed one in front and the other at the back of the said magnets. From these squares project the bearings 10 for the armature and the supports for the machine.

The armature 3 is provided with short radials 11, the grooves between them being deeper than the longest line that joins any two poles through the armature. Each radial is at its extremity reduced to a sharp edge, and on the radial is slipped a coil of wire, with the thinnest portion of the wire toward the center of the armature, the thick ends completely filling the grooves of the periphery. The coils are connected one to the other in series, and the several strands of one coil are connected with the several strands of the other coil. The wires of the field-coil are connected to the coils in any well-known manner. Inasmuch as the armature should be open-circuit wound I prefer a double commutator, as shown in Fig. 3, said commutator 19 consisting of two rows 12 and 13, respectively containing nine copper segments 14, equal to the number of coils in the armature, the said segments being insulated from each other. The said commutator is fastened to the axle 20, the ends of the coil fixed to the commutator-segments, one end of each coil being attached to a segment of the outer row and the other to the corresponding segment of the inner row.

Fig. 3 represents the front of the commutator, where the current is applied or where it is collected. The device that supplies or collects the current is shown in Fig. 4 and resembles a metallic wheel 19ª, divided into four divisions to equal the number of poles of the machine. Like the commutator with which it is brought in contact, it consists of two rows, an inner and an outer one, 15 and 16, respectively provided with segments equal to the number of active coils on the armature, said segments being insulated from each other.

The device thus far described is mounted on a projection 17ª, with which the bearing facing the commutator is provided and is pressed by a suitable spring 18 steadily into contact with the commutator. As is apparent, if a current of electricity enters one segment of the supplier it will enter the armature-coil through the outer row of the commutator and return to the corresponding segment of the inner row of the supplier through the corresponding segment of the inner row of the commutator. By the passage of current through an aramture-coil both coil and radials become magnetized. This magnetism, wherever it may occur, is between two opposite poles of the field, and the armature is therefore propelled from the like pole to the unlike. If a current be supplied to all segments of the supplier and the direction of current in each segment be as marked in Fig. 4, all coils and radials will thereby become magnetized in such a manner that each one will contribute to the motion of the armature. Each coil and radial remains in power for nearly a full quarter of a revolution. The armature moves the commutator against the frictional resistance of the supplier or collector that is fixed, and as long as a commutator-segment rubs against one division of the supplier its coil and radials are magnetized with one polarity; but when the pair of commutator-segments pass off from one division of the supplier until they reach the next division beyond the intervening spoke their coil and radial are cut out of circuit and become inactive.

By adjusting the supplier with its spokes in line with the edges of the field-magnets the coil and radial will become inactive at the exact moment when the edge of the radial comes beneath the edge of the pole. When by the action of the remaining coils the particular coil described is carried beyond the edge of the pole, in order that it may again contribute to the rotation of the armature it is necessary that the direction of the current in it be reversed, since the magnetic field into which in now enters is the reverse from the one it left. These reversals and coöperations of the coils to the same end are attained by the construction of the supplier. On examination of the supplier or collector, Fig. 4, it will be seen that the signs on its division alternate. Thus if in one division the segments of the outer row are marked "plus" and the inner "minus," then the signs in the rows of the neighboring divisions are of just the reverse order—plus in the inner and minus in the outer. This arrangement is carried out through all divisions of the supplier. Hence what happens to one armature-coil in its course happens to all by the same arrangement. There still remains to be remarked that since each supply-segment is wider than the distance between two commutator-segments a new segment comes upon it before one passes off, and since a commutator-segment is thicker than the insulation between two supply-segments it is never left without current in its active positions.

One size of wire should be used on both field and armature.

It is well known that the intensity or voltage of a dynamo or the resistance of a motor is high or low, according to the wire with which it is wound, long and thin or short and thick. It is also well known that the capacity of one thick wire for the induction of current or the transmission of current is not more nor less than the capacity of a number of thin wires that would aggregate in area to the single thick wire. In accordance with these principles if we connect the eight plus ends of the armature-coils to one terminal of a source and the eight minus ends to the other terminal of the source the current will in this case have a path through the armature which is of a capacity sufficient to carry the current as a single wire which is as thick as all the eight wires taken together and as long only as the length of wire on one coil, but when the eight coils of the armature be connected one to the other, all in one series, and then one end of the series be connected to one terminal of the source and the other end of a series to the other terminal of the source the current will in this case experience a resistance which is equal to the resistance of a wire which is as thin as the wire used on this machine and as long as the wires of the eight coils taken together.

From the preceding explanations it will be manifest that the resistance of the machine as a motor depends entirely on the number of separate paths that are prepared for the current, and that to bring to its lowest resistance it will be necessary to give the current every path possible by connecting the eight coils of the armature directly to the source. To increase the resistance, we must decrease the number of paths, and hence if we connect two coils in series and then connect the remaining six coils to a source the current in this case will have but seven passages, and if we make two series of two coils in each these two series, with the remaining four coils, will give only six passages. Three series of two coils in each, with the remaining two coils, form five passages. Four passages are obtained by four series of two coils each, three by connecting one in one series and two in another, and again three in a third, two by connecting four in one and four in another, while the highest resistance is obtained by making for the current one passage by connecting all coils in one single series.

It is understood that the eight wires of the field admit of being connected in the various modes as the eight coils of the armature. As a dynamo, the armature is rotated by mechanical force. By this action current is induced in each of the armature-coils. When all the plus ends of the coils are connected to one terminal of a circuit and all the minus ends to the other terminal, the effect in the current is by this connection precisely the same as from a number of batteries each of which is connected separately to the same circuit. This connection is called a "parallel" for the low intensity or voltage; but when all active coils of the armature be first connected in one single series and then one end of the series connected to one terminal of a circuit and the other end to the other terminal the current in the circuit is then of high intensity or voltage, precisely the same as from a number of batteries that are connected in series to produce high intensity or voltage. The intermediate connections are productive of exactly the same results as the intermediate connections of a number of batteries. From what preceded is understood that the size of wire used on the machine determines the highest voltage it is capable to generate as a dynamo or the highest resistance it may give as a motor, while the number of coils on the armature determine the lowest voltage which it may produce as a dynamo or the lowest voltage that is required for it to work as a motor. The number of degrees in the voltage are always the same as the number of coils on the armature.

The number of variations the machine is capable of are obtained by pulling the handle of a switch, which is diagrammatically illustrated by Fig. 5. It consists of two boards laid one upon the other, one of which is fixed and the other movable. To the fixed board are attached both ends of each field-wire and both ends of each armature-coil, according to the numerals. I must here remark that they are not the direct ends of the armature-coils themselves, since the armature has to move, but of wires which are attached to the back of each segment of the supplier or collector, Fig. 4, which is continually in contact with the ends of the armature-coils. The connections of the ends of the field-wires and armature-coils to the fixed board are shown in Fig. 1. At the bottom of Fig. 5 the sixteen dashes numbered consecutively represent the ends of the armature-coils 1 and 2, the ends of one coil 3 and 4 of the second, and so on. At the top of the figure we observe the same arrangement. There are represented the ends of the eight regular field-wires. The ends designated by the odd numerals, whether above or below, in Fig. 5, as 1 3 5, are the pluses and those by the even, as 2 4 6, are the minuses. If we suppose the beginning of the first coil 1 be connected to the plus terminal of a source and the end of the last 16 be connected to the minus terminal, in order to form a continuous circuit for the current, as well as to connect all coils in one series, we must form connections between the intermediate coils. This is attained by the switch, as is seen at the bottom or top of Fig. 5, where the gaps between the intermediate dashes are bridged by figures resembling brackets, thus ⊓. These brackets are of copper and are attached to the movable board.

That the movable board should singly do the switching for both field and armature it is necessary that it should be of two divisions, an upper to do the switching for the field and a lower to switch the armature, and that also the field and armature should both at once be brought to the same variation.

The vertical lines 1 and $2^b$ at the left and $2^a$ and 3 at the right of Fig. 5 represent copper bars which are attached to the left and right of the movable board. The bars at the left are positive and at the right negative. Both sets of bars are of the same length.

The following description of the lower division is also applicable to the upper: The eight horizontal lines that run from the left bar $2^b$ toward the right and the eight horizontal lines that run from the right bar toward the left are also copper bars at the back of the movable board, insulated each from the other, and carry the same current as the vertical bars to which they are attached. From these horizontal bars extend downward a number of contact-points. These contact-points, together with the inverted brackets, form eight rows of sixteen faces each, and the variations in the voltage or amperes of the machine depend entirely upon which of these rows are brought in contact with the rows of the fixed board.

The outer wires are connected to the switch as follows: the positive to the positive bar 1 of the upper division and the negative to the negative bar of the lower division.

When the machine runs in series, the current from 1 passes the field-wires and comes to $2^a$, this latter, by a copper bar (represented in the figure by the dotted line $r$) is brought in contact with the bar $2^b$, and the current then continues its passage also through the armature-coils and comes to $3^a$, to which is attached the negative wire. In compound-wound dynamos the current runs the same way, but with the difference that it runs also through the shunt-wires 17 $19^b$ $18^a$ $20^a$ of Figs. 1 and 5, which are then connected to form a special circuit. It will be remembered that the fields are wound with ten separate wires, eight of which are the regular field-wires and which are connected as numbered at the upper division of the fixed board. The remaining wires 17 $18^a$ $19^b$ $20^a$, which are for the purpose of conveying the shunted current, are now connected to the vertical bars of the upper division of the movable board, the positive ends 17 19ᵇ of the shunt-wires to the positive bar at the left, and the negative ends 18ᵃ 20ᵃ to 2ᵃ, the negative bar at the right. It is to be understood that the shunt-wires are long enough to admit moving of the switchboard and also that they may be connected to the vertical bars either in series or in pairs.

When it is desired to work the machine in shunt, the shunt-wires remain connected, but the bar which connects in series 2ᵃ to 2ᵇ is now disconnected and is connected between 2ᵃ and 3ᵃ. As a result the lower division becomes cut out of circuit, and the upper division of the switchboard is drawn entirely off the field-wires and is brought in contact with the armature-coils.

The current generated in the armature or shunt passes from the positive bar to the negative in two ways, one a short through the shunt-wires around the fields and one through the circuit.

Of all I have described, what I claim as my invention, and desire to secure by Letters Patent, is—

1. A dynamo or motor comprising the frame having the field-magnets formed thereon, a supplier or collector suitably attached to the said frame provided with a series of segments, a commutator, and armature suitably mounted on a shaft, said commutator being provided with a series of segments adapted to be held in contact with the series of segments on the said collector.

2. A dynamo or motor comprising the frame, the field-magnets provided with beveled outer edges, a shaft journaled in the said frame carrying the armature and the commutator, said commutator being provided with a series of segments one insulated from the other, a supplier or collector suitably attached to the said frame provided with segments one insulated from the other, and means for holding the commutator-segments and the collector-segments into contact.

3. A dynamo or motor comprising the frame provided with field-magnets, a shaft journaled in said frame having an armature and commutator mounted thereon, said commutator being provided with an inner and an outer row of segments one insulated from the other, a collector or supplier secured to the said frame provided with an inner row and an outer row of segments one insulated from the other, adapted to be held in frictional contact with the said segments of the said commutator.

ABRAHAM RAPHAEL GRIEBOV.

Witnesses:
 ALEXANDER BROUTMAN,
 MAX GOLDFUSS.